(12) United States Patent
Hondl

(10) Patent No.: US 9,167,806 B2
(45) Date of Patent: Oct. 27, 2015

(54) ICE FISHING ALARM

(71) Applicant: Brooks Hondl, Dickinson, ND (US)

(72) Inventor: Brooks Hondl, Dickinson, ND (US)

( * ) Notice: Subject to any disclaimer, the term of this patent is extended or adjusted under 35 U.S.C. 154(b) by 93 days.

(21) Appl. No.: 14/165,703

(22) Filed: Jan. 28, 2014

(65) Prior Publication Data
US 2015/0208635 A1 Jul. 30, 2015

(51) Int. Cl.
*A01K 97/12* (2006.01)
*A01K 89/015* (2006.01)
*A01K 97/01* (2006.01)

(52) U.S. Cl.
CPC ............. *A01K 97/12* (2013.01); *A01K 89/015* (2013.01); *A01K 97/01* (2013.01)

(58) Field of Classification Search
CPC ..... A01K 97/01; A01K 97/125; A01K 97/12; A01K 93/02; A01K 89/015
See application file for complete search history.

(56) References Cited

U.S. PATENT DOCUMENTS

| | | | | |
|---|---|---|---|---|
| 2,876,579 A | * | 3/1959 | Plouffe | 43/17 |
| 2,936,541 A | * | 5/1960 | Stanford | 43/17 |
| 3,213,561 A | * | 10/1965 | Roemer | 43/17 |
| 3,359,673 A | * | 12/1967 | Roemer | 43/17 |
| 3,423,867 A | * | 1/1969 | Bartletti | 43/17 |
| 3,641,693 A | | 2/1972 | Pinnow | |
| 3,645,029 A | * | 2/1972 | Roemer | 43/17 |
| 4,228,609 A | * | 10/1980 | Gonnello | 43/16 |
| 4,246,716 A | * | 1/1981 | Elmer | 43/17 |
| 4,934,090 A | * | 6/1990 | Storey et al. | 43/17 |
| 4,942,687 A | * | 7/1990 | Post | 43/17 |
| 5,074,072 A | * | 12/1991 | Serocki et al. | 43/17 |
| 5,488,796 A | * | 2/1996 | Taylor et al. | 43/17 |
| D401,995 S | | 12/1998 | Yamagata | |
| 5,979,101 A | | 11/1999 | Muenchow | |
| 6,408,561 B1 | | 6/2002 | Winter | |
| 6,463,691 B1 | * | 10/2002 | Atkins | 43/17 |
| 6,898,892 B2 | | 5/2005 | Senckowski | |
| 7,032,343 B1 | | 4/2006 | Foss | |
| 2004/0124297 A1 | * | 7/2004 | Steer | 242/223 |
| 2004/0237374 A1 | * | 12/2004 | Klein | 43/21.2 |
| 2009/0139130 A1 | | 6/2009 | Nozzarella | |
| 2012/0285070 A1 | | 11/2012 | Beayon | |

FOREIGN PATENT DOCUMENTS

| | | |
|---|---|---|
| CA | 2036981 | 9/1991 |
| CA | 2167874 | 7/1997 |
| CA | 2379911 | 7/2010 |

* cited by examiner

*Primary Examiner* — Kathleen Alker
(74) *Attorney, Agent, or Firm* — Kyle A. Fletcher, Esq

(57) ABSTRACT

The ice fishing alarm is constructed of a tripod that is placed over top of an ice fishing hole, and which positions a fishing spool there above. The fishing spool includes a knob for manually spooling fishing line. The fishing spool includes a magnet on an opposing side of the fishing spool with respect to the knob. The magnet is aligned adjacent to a spring-loaded alarm, and upon pulling of the fishing line, shall release the spring-loaded alarm. The spring-loaded alarm is in wired connection with an alarm member comprising of a speaker and/or light, which are turned on upon release of the spring-loaded alarm.

16 Claims, 4 Drawing Sheets

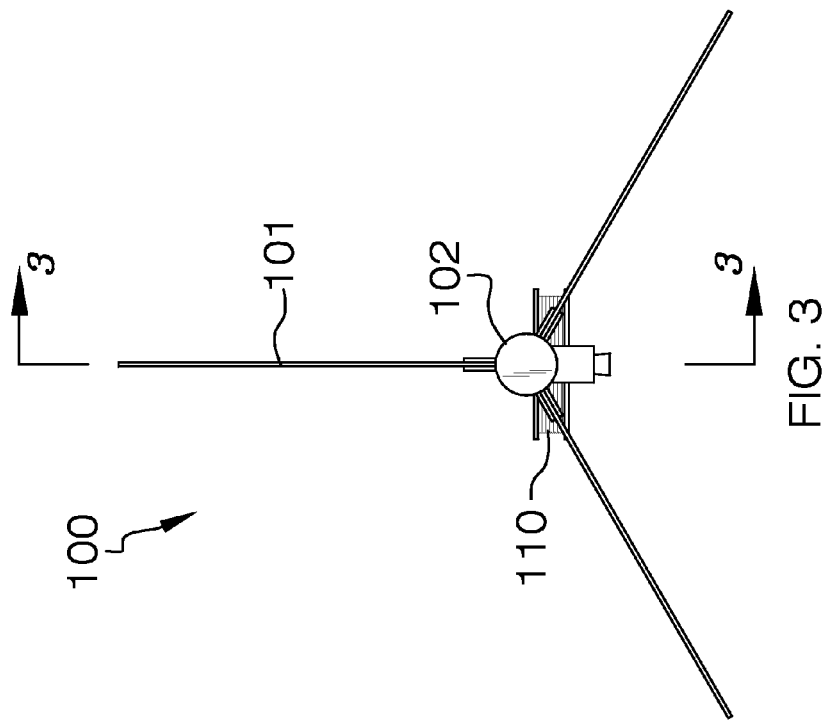
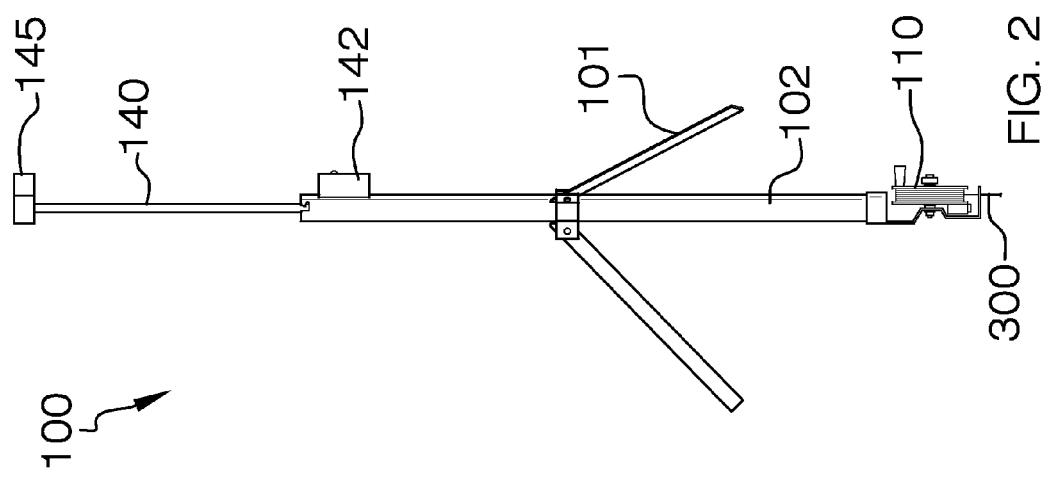

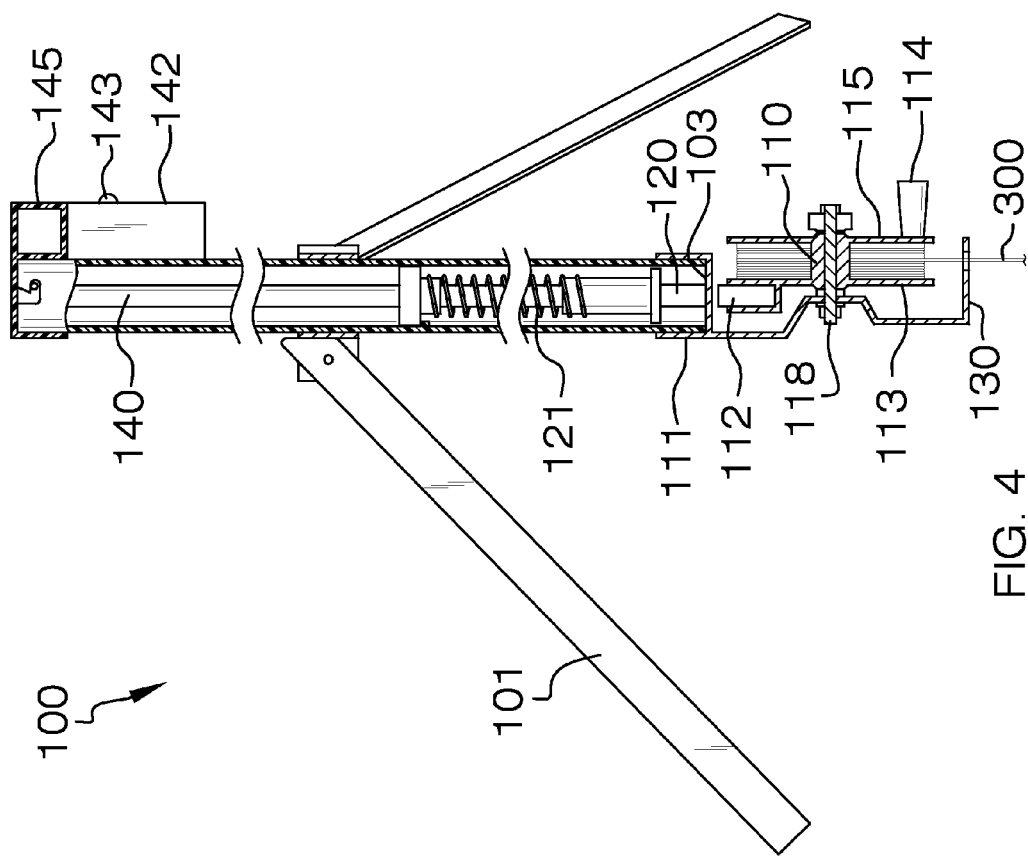
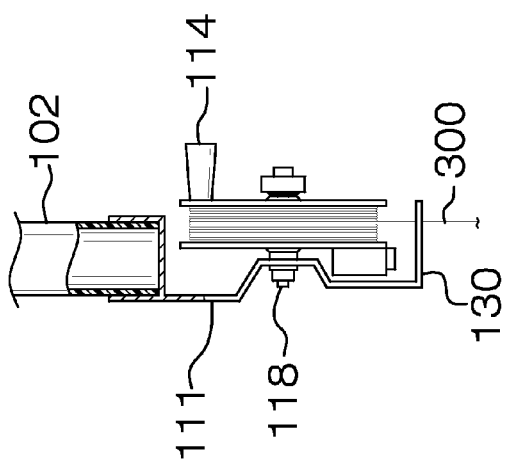

ICE FISHING ALARM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of ice fishing, more specifically, an alarm for use during ice fishing.

SUMMARY OF THE INVENTION

An embodiment of the disclosure meets the needs presented above by generally comprising a tripod that is placed over top of an ice fishing hole, and which positions a fishing spool there above. The fishing spool includes a knob for manually spooling fishing line. The fishing spool includes a magnet on an opposing side of the fishing spool with respect to the knob. The magnet is aligned adjacent to a spring-loaded alarm, and upon pulling of the fishing line, shall release the spring-loaded alarm. The spring-loaded alarm is in wired connection with an alarm member comprising of a speaker and/or light, which are turned on upon release of the spring-loaded alarm.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a side view of the ice fishing alarm by itself.

FIG. 3 is a top view of the ice fishing alarm by itself.

FIG. 4 is a cross-sectional view along line 3-3 in FIG. 3, and depicting the magnets engaged.

FIG. 5 is a second cross-sectional view along line 3-3 in FIG. 3, and depicting the magnets disengaged.

DETAILED DESCRIPTION OF THE EMBODIMENT

Figure 1:
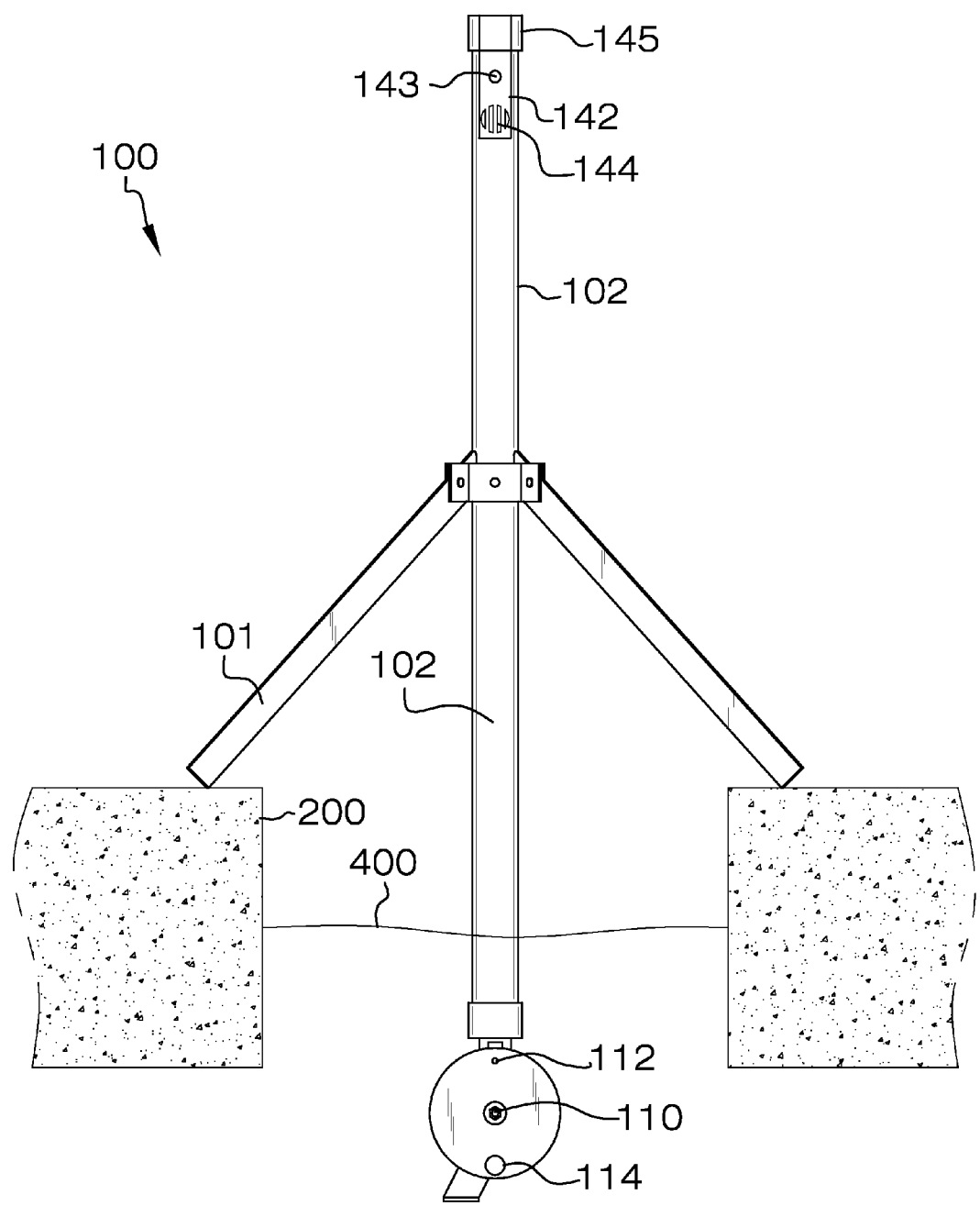
FIG. 1 is a view of the ice fishing alarm installed over top of an ice fishing hole.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 6, the ice fishing alarm 100 (hereinafter invention) generally comprises a plurality of tripod legs 101 that extend outwardly from a vertical member 102. The tripod legs 101 support the invention 100 over top of a fishing hole 200 in order for a fishing line 300 to be placed into water 400.

The vertical member 102 is vertically oriented, and includes a fishing spool 110 at a bottom distal end 103. The fishing spool 110 is responsible for winding up or releasing the fishing line 300 into the water 400. The fishing spool 110 is rotatably engaged on a spool bracket 111. The spool bracket 111 is attached to the bottom distal end 103 of the vertical member 102.

The fishing spool 110 includes a first magnet 112 that is provided on an inner side 113 of the fishing spool 110. Moreover, the first magnet 112 is able to rotate with the fishing spool 110. The fishing spool 110 also includes a knob 114 that is provided on an outer side 115 of the fishing spool 110. The knob 114 provides a means for manually rotating the fishing spool 110 in order to fully retract or dispense the fishing line 300.

Referring to FIG. 4, the first magnet 112 is aligned underneath a second magnet 120. The second magnet 120 is located at the bottom distal end 103 of the vertical member 102. As a side note, the vertical member 102 is a hollowed cylinder, which includes the second magnet 120 at the bottom distal end 103. The second magnet 120 is affixed to a spring member 121, which is also located above the bottom distal end 103 of the vertical member 102. When the first magnet 112 and the second magnet 120 are attracted to one another, the spring member 121 is fully retracted, see FIG. 4.

Now referring to FIG. 5, upon rotation of the fishing spool 110, the first magnet 112 is no longer adjacent the second magnet 120, and the second magnet 120 is pulled upwardly via the spring member 121. The spring member 121 is attached to a trip arm 140.

The spool bracket 111 includes a drag arm 130, which extends downwardly from the bottom distal end 103 of the vertical member 101. Moreover, the drag arm 130 extends across the fishing line 300 in order to aid in rotation of the fishing spool 110 when in use. The spool bracket 111 includes a spool bolt 118, which secures the fishing spool 110 thereon.

The spring member 121 as well as the second magnet 120 are attached to the trip arm 140. The trip arm 140 is positioned above the second magnet 120 and spring member 121. Upon disengagement of the second magnet 120 with respect to the first magnet 112, the spring member 121 shall extend thereby pushing the trip arm 140 upwardly with respect to the vertical member 102.

It shall be noted that the vertical member 102 is further defined with a top distal end 141. The top distal end 141 of the vertical member 102 includes an alarm housing 142 thereon. The alarm housing 142 includes a light member 143 and/or a speaker member 144. The light member 143 and/or the speaker member 144 emit a visual and/or audible alarm in the event that the second magnet 121 becomes disengaged with the first magnet 112.

Figure 6:
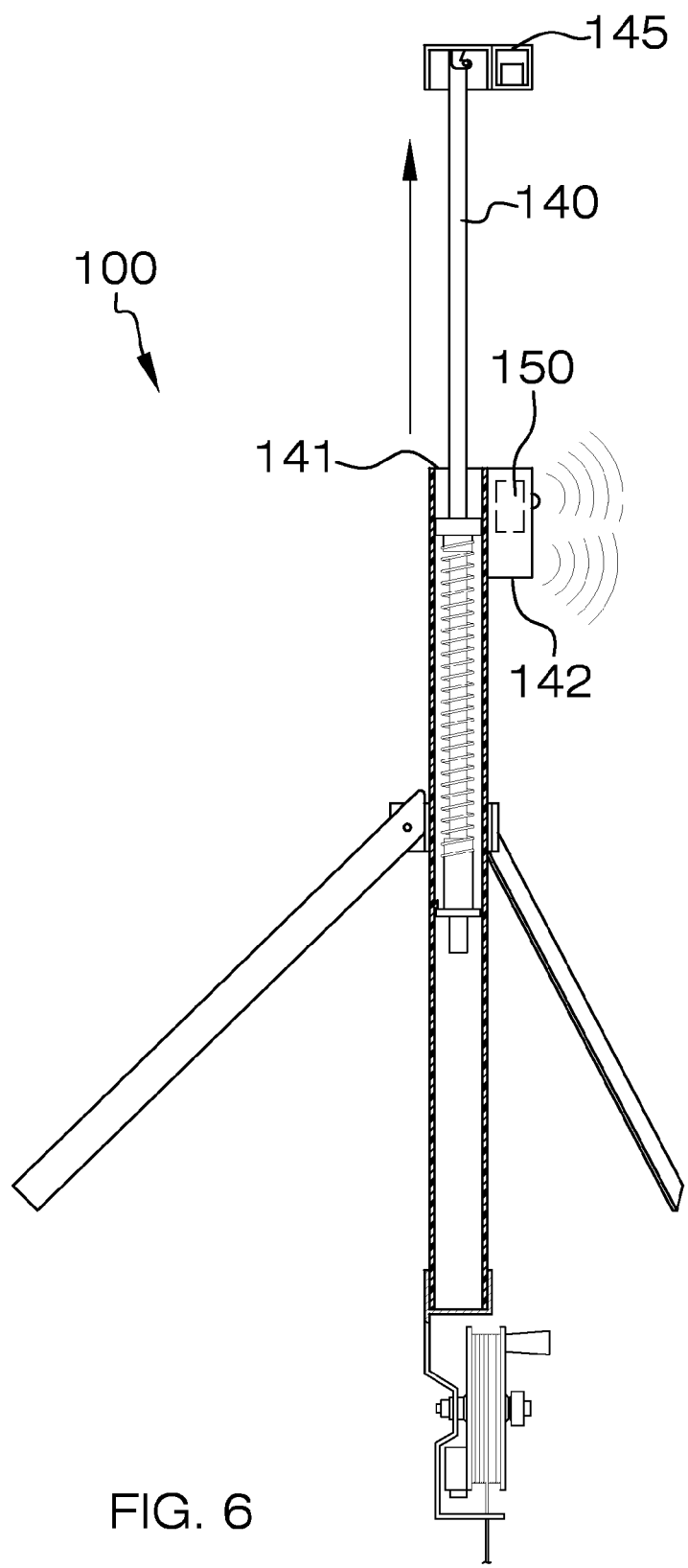
FIG. 6 is another cross-sectional view along line 3-3 in FIG. 3, and depicting the trip arm extending upwardly upon disengagement of the magnets.

Referring to FIGS. 2 and 6, the trip arm 140 pushes a trip arm sensor 145 upwardly when the first magnet 112 is disengaged from the second magnet 121. Referring to FIGS. 1 and 4, the trip arm sensor 145 is positioned adjacent the alarm housing 142, but is pushed upwardly via the trip arm 140 once the fishing spool 110 rotates thereby disengaging the first magnet 112 with respect to the second magnet 121. The alarm housing 142 includes an alarm magnet 150 that detects whether the trip arm sensor 145 is adjacent thereto or has extended vertically via the trip arm 140.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An ice fishing alarm system comprising:
   tripod legs extending from a vertical member;
   wherein the tripod legs are configured to support the vertical member above a fishing hole in order to drop a fishing line into water;
   a fishing spool is rotatably engaged underneath the vertical member;
   the fishing spool is adapted to wind and unwind the fishing line thereon;
   a first magnet is attached to the fishing spool, and is aligned adjacent to a second magnet attached to a spring member and a trip arm;
   upon disengagement of the second magnet with respect to the first magnet, the trip arm extends vertically with respect to the vertical member in order to emit an alarm as to the detection of movement of the fishing line signifying a potential fish catch;
   wherein the vertical member is further defined with a top distal end; wherein the top distal end of the vertical member includes an alarm housing thereon;
   wherein the trip arm pushes a trip arm sensor upwardly when the first magnet is disengaged with the second magnet; wherein the trip arm sensor is positioned adjacent the alarm housing, and is pushed upwardly via the trip arm once the fishing spool rotates thereby disengaging the first magnet with respect to the second magnet; wherein the alarm housing includes an alarm magnet that detects whether the trip arm sensor is adjacent thereto or has extended vertically via the trip arm.

2. The ice fishing alarm system according to claim 1 wherein the vertical member is vertically oriented, and includes the fishing spool at a bottom distal end; wherein the fishing spool is rotatably engaged on a spool bracket; wherein the spool bracket is attached to the bottom distal end of the vertical member.

3. The ice fishing alarm system according to claim 2 wherein the fishing spool includes the first magnet that is provided on an inner side of the fishing spool; wherein the first magnet is able to rotate with the fishing spool; wherein the fishing spool also includes a knob that is provided on an outer side of the fishing spool; wherein the knob enables manual rotation of the fishing spool in order to fully retract or dispense the fishing line.

4. The ice fishing alarm system according to claim 3 wherein the first magnet is aligned underneath the second magnet; wherein the second magnet is located at the bottom distal end of the vertical member.

5. The ice fishing alarm system according to claim 4 wherein the vertical member is a hollowed cylinder, which includes the second magnet at the bottom distal end;
   wherein the second magnet is affixed to the spring member, which is also located above the bottom distal end of the vertical member.

6. The ice fishing alarm system according to claim 5 wherein the spool bracket includes a drag arm, which extends downwardly from the bottom distal end of the vertical member; wherein the drag arm is adapted to extend across the fishing line in order to aid in rotation of the fishing spool when in use; wherein the spool bracket includes a spool bolt, which secures the fishing spool thereon.

7. The ice fishing alarm system according to claim 6 wherein the spring member as well as the second magnet are attached to the trip arm; wherein the trip arm is positioned above the second magnet and the spring member; where upon disengagement of the second magnet with respect to the first magnet, the spring member shall extend thereby pushing the trip arm upwardly with respect to the vertical member.

8. The ice fishing alarm system according to claim 1 wherein the alarm housing includes a light member.

9. The ice fishing alarm system according to claim 8 wherein the alarm housing includes a speaker member.

10. An ice fishing alarm system comprising:
    tripod legs extending from a vertical member;
    wherein the tripod legs support the vertical member above a fishing hole in order to drop a fishing line into water;
    a fishing spool is rotatably engaged underneath the vertical member;
    the fishing spool winds and unwinds the fishing line thereon;
    a first magnet is attached to the fishing spool, and is aligned adjacent to a second magnet attached to a spring member and a trip arm;
    upon disengagement of the second magnet with respect to the first magnet, the trip arm extends vertically with respect to the vertical member in order to emit an alarm as to the detection of movement of the fishing line signifying a potential fish catch;
    wherein the vertical member is vertically oriented, and includes the fishing spool at a bottom distal end; wherein the fishing spool is rotatably engaged on a spool bracket; wherein the spool bracket is attached to the bottom distal end of the vertical member;
    wherein the fishing spool includes the first magnet that is provided on an inner side of the fishing spool; wherein the first magnet is able to rotate with the fishing spool; wherein the fishing spool also includes a knob that is provided on an outer side of the fishing spool; wherein the knob enables manual rotation of the fishing spool in order to fully retract or dispense the fishing line;
    wherein the vertical member is further defined with a top distal end; wherein the top distal end of the vertical member includes an alarm housing thereon;
    wherein the trip arm pushes a trip arm sensor upwardly when the first magnet is disengaged with the second magnet; wherein the trip arm sensor is positioned adjacent the alarm housing, and is pushed upwardly via the trip arm once the fishing spool rotates thereby disengaging the first magnet with respect to the second magnet; wherein the alarm housing includes an alarm magnet that detects whether the trip arm sensor is adjacent thereto or has extended vertically via the trip arm.

11. The ice fishing alarm system according to claim 10 wherein the first magnet is aligned underneath the second magnet; wherein the second magnet is located at the bottom distal end of the vertical member.

12. The ice fishing alarm system according to claim 11 wherein the vertical member is a hollowed cylinder, which includes the second magnet at the bottom distal end; wherein the second magnet is affixed to the spring member, which is also located above the bottom distal end of the vertical member.

13. The ice fishing alarm system according to claim 12 wherein the spool bracket includes a drag arm, which extends downwardly from the bottom distal end of the vertical member; wherein the drag arm extends across the fishing line in order to aid in rotation of the fishing spool when in use; wherein the spool bracket includes a spool bolt, which secures the fishing spool thereon.

14. The ice fishing alarm system according to claim 13 wherein the spring member as well as the second magnet are attached to the trip arm; wherein the trip arm is positioned above the second magnet and the spring member; where upon disengagement of the second magnet with respect to the first magnet, the spring member shall extend thereby pushing the trip arm upwardly with respect to the vertical member.

15. The ice fishing alarm system according to claim 14 wherein the alarm housing includes a light member.

16. The ice fishing alarm system according to claim 15 wherein the alarm housing includes a speaker member.

* * * * *